United States Patent
Watanabe et al.

(10) Patent No.: US 6,735,509 B2
(45) Date of Patent: May 11, 2004

(54) APPARATUS FOR CONTROLLING VEHICLE DRIVE SYSTEM INCLUDING DRIVE POWER SOURCE AND AUTOMATIC TRANSMISSION

(75) Inventors: Kazuyuki Watanabe, Anjo (JP); Naoyuki Sakamoto, Toyota (JP); Atsushi Ayabe, Toyota (JP); Toshimitsu Sato, Toyota (JP); Hiromichi Kimura, Okazaki (JP); Hideaki Ogasawara, Anjo (JP); Mitsuhiro Nakamura, Anjo (JP); Noboru Shibata, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/206,040

(22) Filed: Jul. 29, 2002

(65) Prior Publication Data

US 2003/0027684 A1 Feb. 6, 2003

(30) Foreign Application Priority Data

Jul. 31, 2001 (JP) ........................................ 2001-232349

(51) Int. Cl.$^7$ .............................................. G06F 17/00
(52) U.S. Cl. .............................. 701/62; 701/51; 701/55; 701/56
(58) Field of Search .............................. 701/62, 51, 55, 701/56, 64; 477/34, 107, 906

(56) References Cited

U.S. PATENT DOCUMENTS 5,072,631 A * 12/1991 Fujimoto et al. ........... 477/111
5,209,141 A * 5/1993 Asayama et al. ........... 477/154

FOREIGN PATENT DOCUMENTS

JP    6-331013    11/1994
JP    8-145157    6/1996

* cited by examiner

Primary Examiner—Yonel Beaulieu
(74) Attorney, Agent, or Firm—Oblon, Spivak, McClelland, Maier & Neustadt, P.C.

(57) ABSTRACT

Apparatus for controlling a vehicle drive system including an automatic transmission, including a feedback controller operable upon a shift-down action of the transmission effected by concurrent releasing and engaging actions of first and second frictional coupling devices during an operation of a manually operable vehicle accelerating member to drive the vehicle with the drive power soruce, for controlling an engaging force of the first frictional coupling device, and a learning compensator operable upon detection of an abnormality of the shift-down action, for learning compensation of an initial value of the engaging force at which a feedback control of the engaging force is initiated, or an output reducing device for reducing an output of a drive power source when input speed of the transmission has been increased to a value close to a synchronization value, and/or upon racing of the drive power source during the shift-down action.

14 Claims, 11 Drawing Sheets

FIG. 2

| POSITION | | CLUTCHES AND BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st-SPEED ENGIN BRAKE | ○ | × | × | × | × | × | ○ | △ | △ |

APPARATUS FOR CONTROLLING VEHICLE DRIVE SYSTEM INCLUDING DRIVE POWER SOURCE AND AUTOMATIC TRANSMISSION

This application is based on Japanese Patent Application Nos. 2001-232349 filed on Jul. 31, 2001, the contents of which are incorporated hereinto by reference.

BACKGROUND OF THE INVENTION

1. Field of the Invention

The present invention relates in general to an apparatus for controlling a drive system for an automotive vehicle, which drive system includes a drive power source and an automatic transmission. More particularly, the invention is concerned with improvements of an apparatus arranged to feedback-control an engaging force of a frictional coupling device which is released to effect a shift-down action of the automatic transmission, concurrently with an engaging action of another frictional coupling device, during an operation of a manually operable vehicle accelerating member to drive the vehicle.

2. Discussion of Related Art

In an automotive vehicle, there is widely used an automotive transmission having a plurality of forward drive positions which have respective different speed ratios and which are selectively established by respective combinations of engaging and releasing actions of a plurality of frictional coupling devices. An automatic transmission of this type is automatically shifted up and down on the basis of suitably selected parameters such as an operating amount of an accelerator pedal and a running speed of the vehicle, and according to a predetermined relationship between a running condition of the vehicle defined by the selected parameters and the operating position to which the automatic transmission should be shifted. The predetermined relationship may be represented by a stored shift-boundary data map, as indicated in the graph of FIG. 6 by way of example. It will be understood from shift-down boundary lines indicated by broken lines in FIG. 6 that the automatic transmission is shifted down to increase the sped ratio when the vehicle running speed V is lowered or when an opening angle $\theta_{TH}$ of a throttle valve (corresponding to the operating amount of the accelerator pedal) is increased. The speed ratio is a ratio of an input speed to an output speed of the automatic transmission. Some of the forward drive positions are established by concurrent engaging and releasing actions of respective two frictional coupling devices, namely, an engaging action of a first frictional coupling device and a releasing action of a second frictional coupling device, which take place concurrently with each other. When the automatic transmission is shifted by such concurrent engaging and releasing actions of the two frictional coupling devices, there may arise abnormal shifting behaviors of the frictional coupling devices, which cause a racing of a drive power source such as an engine, and a so-called "tie-up" behavior which causes a delayed shifting action of the automatic transmission to the selected forward drive position. The racing of the drive power source takes place when the first frictional coupling device to be released is prematurely brought to a substantially released state while the second frictional coupling device to be engaged is still in a substantially fully released state. On the other hand, the tie-up behavior takes place when the second frictional coupling device is prematurely brought to a substantially engaged state while the first frictional coupling device is still in a substantially fully engaged state. Therefore, the concurrent engaging and releasing actions of the two frictional coupling devices must be intricately controlled. JP-A-8-145157 discloses an example of controlling concurrent engaging and releasing actions of the two frictional coupling devices to effect a shift-up action of the automatic transmission to reduce the speed ratio, such that the engaging force of the second frictional coupling device to be engaged is controlled in a feedback fashion, and such that the engaging force at which the feedback control is initiated is updated by a learning compensation technique.

In a control apparatus disclosed in the above-identified publication, however, the first frictional coupling device to be released is not controlled is instantaneously released without controlling its engaging force in the process of the releasing action. This control apparatus suffers from a racing of the drive power source, which takes place when the releasing action of the first frictional coupling device and the engaging action of the second coupling device are effected to effect a shift-down action of the automatic transmission to increase the speed ratio, in response to an abrupt or rapid increase of a vehicle-operator's required vehicle drive force to drive the vehicle. The required vehicle drive force may be represented by the operating amount of the accelerator pedal, and may reflect the operator's desire to accelerate the vehicle. It is also noted that such a shift-down action of the automatic transmission in response to an abrupt increase of the operator's required vehicle drive force is generally required to be completed in a relatively short time, in order to meet the operator's desire to accelerate the vehicle. In this respect, it would be difficult to accurately feedback-control the engaging force of the first frictional coupling device in the process of its releasing action, due to a low control response of the engaging force.

SUMMARY OF THE INVENTION

The present invention was made in the light of the background art discussed above. It is therefore an object of the present invention to provide an apparatus for controlling a vehicle drive system including an automatic transmission, which apparatus prevents or minimizes a racing of a drive power source or any other drawback which may be caused by abnormal shifting behaviors of two frictional coupling devices in the process of respective concurrent engaging and releasing actions thereof to effect a shift-down action of the automatic transmission during an operation of a vehicle accelerating member to drive the vehicle.

The object indicated above may be achieved according to one aspect of this invention, which provides an apparatus for controlling a drive system of an automotive vehicle including a manually operable vehicle accelerating member, a drive power source, and an automatic transmission having a plurality of forward drive positions which have respective different speed ratios and which are selectively established by respective combinations of engaging and releasing actions of a plurality of frictional coupling devices, the apparatus comprising feedback control means operable upon a shift-down action of the automatic transmission which is effected by concurrent releasing and engaging actions of respective first and second frictional coupling devices of the plurality of frictional coupling devices, during an operation of the vehicle accelerating member to drive the automotive vehicle with the drive power source, the feedback control means feedback-controlling an engaging force of the first frictional coupling device, the apparatus being characterized by further comprising: shifting-abnormality detecting means for detecting one of a racing of the drive power source and a tie-up behavior of the first and second frictional coupling devices during the shift-down action of the automatic transmission; and learning compensation means operable upon detection of the above-indicated one of the racing and the tie-up behavior by the shifting-abnormality detecting means, for effecting learning compensation of an initial value of the engaging force of the first frictional coupling device at which a feedback control of the engaging force by the feedback control means is initiated.

The vehicle drive system control apparatus according to the first aspect of this invention describe above is arranged to feedback-control the engaging force of the first frictional coupling device which is released to effect the shift-down action during an operation of the manually operable vehicle accelerating member to drive the vehicle, and is further arranged to change the initial value of the engaging force of the first frictional coupling device (at which the feedback control of the engaging force is initiated), when a racing of the drive power source or tie-up behavior of the first and second frictional coupling devices is detected, so that the engaging force of the first frictional coupling device can be suitably controlled, irrespective of a low feedback control response of the engaging force, and the shift-down action can be achieved in a comparatively short time while preventing the engine racing and the tie-up behavior of the first and second frictional coupling devices.

The racing of the drive power source is an excessive rise of the operating speed of the drive power source while the first and second coupling devices are both placed in the released state. Upon subsequent engagement of the second frictional coupling device, there arises a considerably large amount of change of the vehicle drive force, undesirably causing a shifting shock and/or an excessively large shifting noise. On the other hand, the tie-up behavior of the first and second frictional coupling devices takes place when these two frictional coupling devices are both placed in the engaged state. The tie-up behavior undesirably causes a delay in the shift-down action, and a shifting shock due to a sudden decrease of the vehicle drive force.

As the automatic transmission, there is widely known a transmission of planetary gear type including a plurality of planetary gear sets connected to each other. As the frictional coupling devices, hydraulic frictional coupling devices operated by hydraulic actuators are suitably used. In this case, the engaging force of the first frictional coupling device can be controlled by controlling the duty ratio of a linear solenoid provided to control the hydraulic pressure to be applied to the hydraulic actuator.

For example, the automatic transmission is automatically shifted up and down on the basis of selected parameters representative of a running condition of the vehicle, such as a vehicle-operator's required vehicle drive force (required output of the drive power source as represented by an operating amount of an accelerator pedal, or an opening angle of a throttle valve, for instance), and a running speed of the vehicle, and according to a predetermined relationship between the vehicle running condition and the operating position to which the automatic transmission should be shifted. The predetermined relationship may be represented by a stored data map, and is usually formulated such that the transmission is shifted down to increase the speed ratio, when the required vehicle drive force is increased or when the vehicle running speed is lowered. The shift-down action of the automatic transmission during which the shifting-abnormality detecting means is operated to detect the racing of the drive power source or the tie-up behavior of the first and second frictional coupling devices is a shift-down action which is effected during an operation of the vehicle accelerating member to drive the vehicle with the drive power source. This shift-down action may be a two-step shift-down action from a $4^{th}$-speed position to a $2^{nd}$-speed position, as well as an ordinary one-step shift-down action from the $4^{th}$-speed position to a $3^{rd}$-speed position, or from the $3^{rd}$-speed position to the $2^{nd}$-speed position.

The shift-down action is effected when the required vehicle drive force (required output of the drive power source) as represented by the operating amount of the vehicle accelerating member such as an accelerator pedal is increased while the vehicle is driven by the drive power source, that is, while the vehicle drive force is transmitted from the drive power source to the vehicle drive wheels. The shift-down action is effected not only when the required output of the drive power source as represented by the amount of operation of the vehicle accelerating member (accelerator pedal) by the vehicle operator, for instance, is increased, but also when the shift lever is operated by the vehicle operator to increase the vehicle drive force, and when an increase of the vehicle drive force is required to drive the vehicle on an uphill road without a considerable decrease of the running speed. The required vehicle drive force is increased when the opening angle of the throttle valve is increased automatically by an auto-cruise control apparatus while the vehicle is running on an uphill road in an auto-cruising mode, as well as when the amount of operation of the accelerator pedal by the vehicle operator is increased while the vehicle is running in a normal mode.

As the drive power source, an internal combustion engine such as a gasoline engine or a diesel engine may be suitably used. However, any other drive power source such as an electric motor may be used. The drive system may include a fluid-operated power transmitting device such as a torque converter or a fluid coupling, and a vehicle starting clutch which is selectively engaged and released. These fluid-operated power transmitting device and vehicle starting clutch are disposed between the drive power source and the automatic transmission.

The feedback control means may be arranged to feedback-control the engaging force of the first frictional coupling device on the basis of a difference between actual and target values of the input speed of the automatic transmission, such that the input speed is increased according to a predetermined rate, or in a predetermined pattern as represented by a desired curve. In this respect, the operating speed of the drive power source may be used in place of the input speed of the automatic transmission, provided the speed of the drive power source is almost equal to the input speed. The speed of the drive power source may be used as a parameter in place of the input speed, by any functional means other than the feedback control means, where appropriate. For instance, the shifting-abnormality detecting means may use the speed of the drive power source, to detect the racing of the drive power source or the tie-up behavior of the first and second frictional coupling devices, as described just below.

According to one preferred form of the first aspect of the invention, the shifting-abnormality detecting means detects the racing of the drive power source or the tie-up behavior of the first and second frictional coupling devices, on the basis of a change of an input speed of the automatic transmission in the process of the shift-down action, or a change of the operating speed of the drive power source.

According to a second preferred form of the first aspect of the invention, the learning compensation means changes the initial value of the engaging force by an amount which is determined on the basis of a difference of a time length during which an input speed of the automatic transmission changes between two predetermined values in the process of the shift-down action, with respect to a predetermined target value. In this case, too, the speed of the drive power source may be used in place of the input speed. The above-indicated time length corresponds to a rate of change of the input speed, and the above-indicated amount of change of the initial value may be a learning compensation value obtained on the basis of the above-indicated difference of the time length from the predetermined target value, which difference is obtained in the process of the shift-down action. However, the learning compensation means may be adapted to change the initial value of the engaging force by a constant amount which is suitably determined.

The above indicated above may also be achieved according to a second aspect of this invention, which provides an apparatus for controlling a drive system of an automotive vehicle including a manually operable vehicle accelerating member, a drive power source, and an automatic transmission having a plurality of forward drive positions which have respective different speed ratios and which are selectively established by respective combinations of engaging and releasing actions of a plurality of frictional coupling devices, the apparatus comprising feedback control means operable upon a shift-down action of the automatic transmission which is effected by concurrent releasing and engaging actions of respective first and second frictional coupling devices of the plurality of frictional coupling devices, during an operation of the vehicle accelerating member to drive the automotive vehicle with the drive power source, the feedback control means feedback-controlling an engaging force of the first frictional coupling device, the apparatus being characterized by further comprising: substantial synchronization determining means operable upon the shift-down action of the automatic transmission during the operation of the vehicle accelerating member, for determining whether an input speed of the automatic transmission has been increased to a threshold value close to a synchronization speed to be established after completion of the shift-down action; and pre-synchronization output reducing means operable upon determination by the substantial synchronization determining means that the input speed has been increased to the threshold value, for reducing an output of the drive power source.

The vehicle drive system control apparatus according to the second aspect of the present invention is arranged to feedback-control the engaging force of the first frictional coupling device which is released to effect the shift-down action during an operation of the manually operable vehicle accelerating member to drive the vehicle, and is further arranged to reduce the output of the drive power source when the input speed of the automatic transmission has been increased to the threshold value close to the synchronization speed. Accordingly, the shift-down action can be achieved in a relatively short time, while preventing a racing of the drive power source, irrespective of a low feedback control response of the engaging force of the first frictional coupling device.

According to a first preferred form of the second aspect of the invention, the substantial synchronization determining means determines whether the input speed of the automatic transmission has been increased to the threshold value, depending upon whether a difference of the input speed from the synchronization speed has become smaller than a predetermined amount. In this case, too, the input speed of the automatic transmission may be replaced by the speed of the drive power source.

According to a second preferred form of the second aspect of the invention, the pre-synchronization output reducing means reduces the output of the drive power source, by retarding an ignition timing of the drive power source. This form of the apparatus is effective to improve the control response, particularly where the drive power source is an internal combustion engine such as a gasoline engine. The method of reducing the output of the drive power source is desirably determined by the specific type of the drive power source. In one advantageous arrangement of the above preferred form of the second aspect of the invention, the pre-synchronization output reducing means retards the ignition timing on the basis of a running speed of the vehicle and an estimated input torque of the automatic transmission, and according to a predetermined data map or equation. In this case, the ignition timing can be intricately controlled. However, the pre-synchronization output reducing means may be arranged to reduce the output of the drive power source or retard the ignition timing, by a predetermined constant amount. The pre-synchronization output reducing means may start the reduction of the output of the drive power source, immediately after the moment of a determination by the substantial synchronization determining means that the input speed of the automatic transmission has been increased to the threshold value close to the synchronization speed. Alternatively, the pre-synchronization output reducing means starts the reduction of the output of the drive power source, a predetermined delay time after the moment of the determination by the substantial synchronization determining means. The delay time may be determined depending upon the specific manner of the determination by the substantial synchronization determining means.

According to a second preferred form of the second aspect of the invention, the vehicle drive system control apparatus further comprises: racing-abnormality detecting means for detecting a racing of the drive power source during the shift-down action of the automatic transmission during the operation of the vehicle accelerating member; and racing-abnormality output reducing means operable upon detection of the racing by the racing-abnormality detecting means, for immediately reducing an output of the drive power source. According to a third preferred form of the second aspect of the invention, the vehicle drive system control apparatus further comprises: shifting-abnormality detecting means for detecting one of a racing of the drive power source and a tie-up behavior of the first and second frictional coupling devices during the shift-down action of the automatic transmission; and learning compensation means operable upon detection of the racing or the tie-up behavior by the shifting-abnormality detecting means, for effecting learning compensation of an initial value of the engaging force of the first frictional coupling device at which a feedback control of the engaging force by the feedback control means is initiated.

The object indicated above may also be achieved according to a third aspect of this invention, which provides an apparatus for controlling a drive system of an automotive vehicle including a manually operable vehicle accelerating member, a drive power source, and an automatic transmission having a plurality of forward drive positions which have respective different speed ratios and which are selectively established by respective combinations of engaging and releasing actions of a plurality of frictional coupling devices, the apparatus comprising feedback control means operable upon a shift-down action of the automatic transmission which is effected by concurrent releasing and engaging actions of respective first and second frictional coupling devices of the plurality of frictional coupling devices, during an operation of the manually operable vehicle accelerating member to drive the automotive vehicle with the drive power source, the feedback control means feedback-controlling an engaging force of the first frictional coupling device, the apparatus being characterized by further comprising: racing-abnormality detecting means for detecting a racing of the drive power source during the shift-down action of the automatic transmission; and racing-abnormality output reducing means operable upon detection of the racing by the racing-abnormality detecting means, for immediately reducing an output of the drive power source.

The racing of the drive power source has been described above with respect to the first aspect of the invention. In the apparatus according to the third aspect of the invention, the output of the drive power source is reduced immediately after the detection of the racing. Accordingly, the racing-abnormality detecting means is required to monitor the input speed of the automatic transmission or the speed of the drive power source, for detecting the racing of the drive power source, in the process of the shift-down action. Therefore, the method of and the threshold value used for detecting the racing in the apparatus according to the third aspect of the invention may be different from those in the apparatus according to the first aspect of the invention.

The vehicle drive system control apparatus according to the third aspect of the invention is arranged to feedback-control the engaging force of the first frictional coupling device which is released to effect the shift-down action during the operation of the manually operable vehicle accelerating member, and is further arranged such that the output of the drive power source is reduced immediately after the detection of the racing of the drive power source. Accordingly, the shift-down action can be achieved in a relatively short time, while preventing the racing of the drive power source, irrespective of a low feedback control response of the hydraulic pressure.

According to a first preferred form of the third aspect of the invention, the racing-abnormality detecting means detects the racing of the drive power source, depending upon whether an input speed of the automatic transmission has become higher by more than a predetermined amount than a synchronization speed to be established after completion of the shift-down action. In this case, the input speed may be replaced by the speed of the drive power source. Further, a rate of change of the input speed of the transmission (a rate or change of the speed of the drive power source) may be used in addition to the input speed (the speed of the drive power source) per se.

According to a second preferred form of the third aspect of the invention, the racing-abnormality output reducing means reduces the output of the drive power source, by retarding an ignition timing of the drive power source. This form of the vehicle drive system control apparatus is effective to improve the control response, particularly where the drive power source is an internal combustion engine such as a gasoline engine. The method of reducing the output of the drive power source is desirably determined by the specific type of the drive power source. In one advantageous arrangement of the above-indicated preferred form of the third aspect of the invention, the racing-abnormality output reducing means is arranged to retard the ignition timing on the basis of a running speed of the vehicle and an estimated input torque of the automatic transmission, and according to a predetermined data map or equation. In this case, the ignition timing can be intricately controlled. However, the racing-abnormality output reducing means may be arranged to reduce the output of the drive power source or retard the ignition timing, by a predetermined constant amount.

According to a third preferred form of the third aspect of the invention, the apparatus further comprises: shifting-abnormality detecting means for detecting one of a racing of the drive power source and a tie-up behavior of the first and second frictional coupling devices during the shift-down action of said automatic transmission; and learning compensation means operable upon detection of the racing of the drive power source or the tie-up behavior of the shifting-abnormality detecting means, for effecting learning compensation of an initial value of the engaging force of the first frictional coupling device at which a feedback control of the engaging force by the feedback control means is initiated.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which:

FIG. 2 is a view indicating a relationship between combinations of operating states of frictional coupling devices in the form of clutches and brakes of an automatic transmission of the vehicle drive system of FIG. 1, and operating positions of the automatic transmission which are established by the respective combinations;

DETAILED DESCRIPTION OF THE PREFERRED EMBODIMENT

Figure 1:
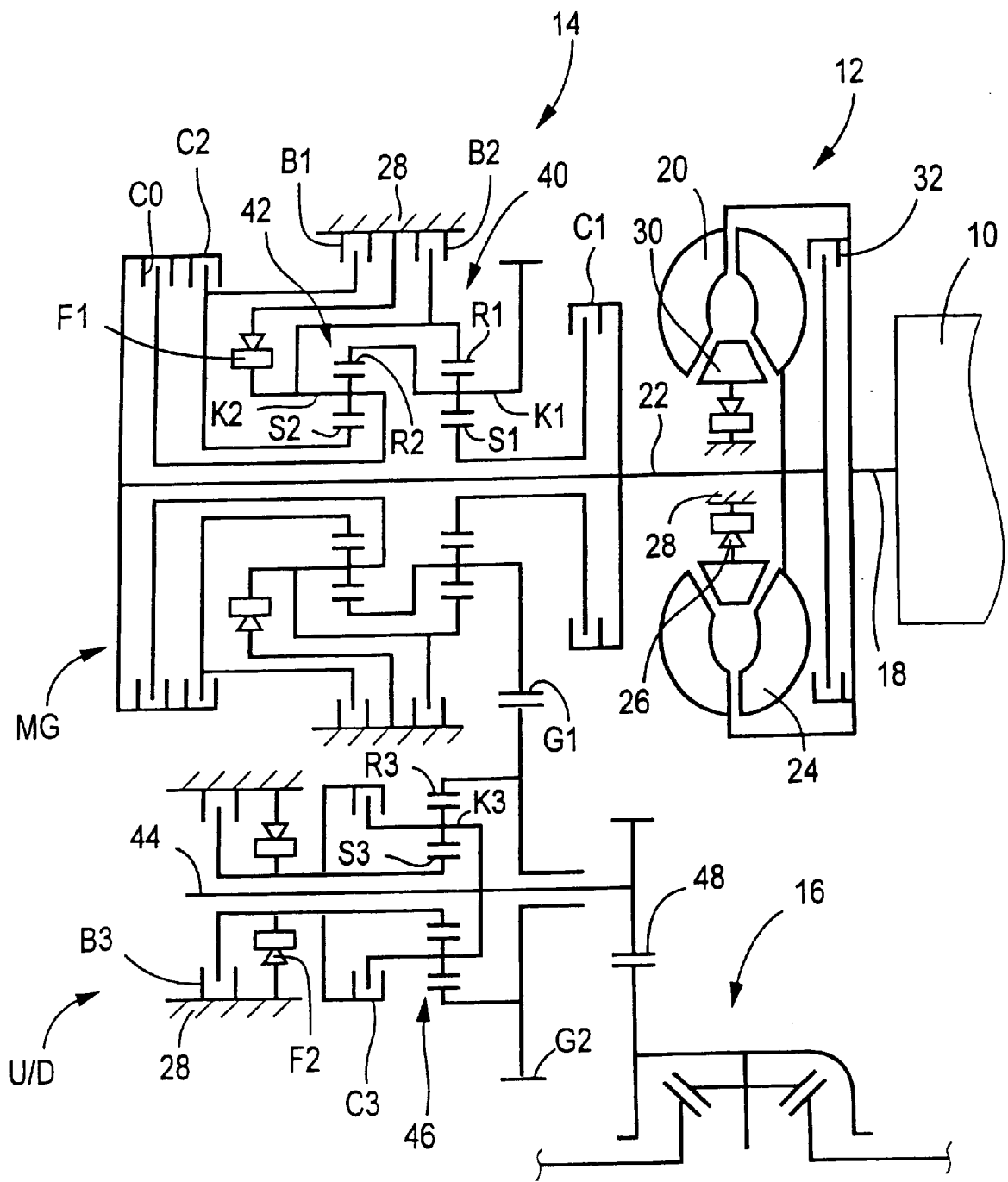
FIG. 1 is a schematic view showing an arrangement of a vehicle drive system to which a control apparatus according to the present invention is applicable.

Referring first to the schematic view of FIG. 1, there is shown an arrangement of a vehicle drive system of a transverse FF (front-engine front-drive) vehicle. The vehicle drive system includes a drive power source in the form of an engine 10 such as a gasoline engine, a fluid-operated power transmitting device in the form of a torque converter 12, an automatic transmission 14, and a differential gear device 16. An output of the engine 10 is transmitted to front drive wheels (not shown) of the vehicle through the torque converter 12, automatic transmission 14 and differential gear device 16. The torque converter 12 includes a pump impeller 20 connected to a crankshaft 18 of the engine 10, a turbine impeller 24 connected to an input shaft 20 of the automatic transmission 14, a stator 30 fixed through a one-way clutch 26 to a stationary member in the form of a housing 28, and a lock-up clutch 32 connected to the input shaft 22 through a damper (not shown).

The automatic transmission 14 includes a planetary gear mechanism of so-called "CR—CR connection" type consisting of a first single-pinion planetary gear set 40 and a second single-pinion planetary gear set 42 which are disposed coaxially with each other on the input shaft 22 and which are constructed such that ring gears R1, R2 of the first and second planetary gear sets 40, 42 are connected to respective carriers K2, K1 of the second and first planetary gear sets 42, 40. The automatic transmission 14 further includes a third planetary gear set 46 disposed on a counter shaft 44 parallel to the input shaft 22, and an output gear 48 which is fixed to one end of the counter shaft 44 and which meshes with the differential gear device 16. Each of the first, second and third planetary gear sets 40, 42, 46 has rotary elements in the form of a gun gear S, a ring gear R, a planetary gear meshing with the sun gear and the ring gear, and a carrier K rotating supporting the planetary gear. Selected ones of the sun gears, ring gears and carriers of the three planetary gear sets 40, 42, 46 are connected to each other through selected ones of clutches C0, C1, C2 and C3, and are fixed to the housing 28 (stationary member) through selected ones of brakes B1, B2 and B3. Further, selected ones of the rotary elements are connected to each other or fixed to the housing 28, through one-way clutches F1 and F2, depending upon the direction of rotation of the rotary elements. Since the differential gear device 16 is symmetrical with respect to its axis (front axles), only an upper half of the device 16 is shown in FIG. 1.

The first and second planetary gear sets 40, 42 disposed on the input shaft 22, the clutches C0, C1 and C2, the brakes B1 and B2, and the one-way clutch F1 cooperate to constitute a main shifting portion MG which is operable to establish four forward drive positions and one rear drive position. On the other hand, the third planetary gear set 46 disposed on the counter shaft 44, the clutch C3, the brake B3 and the one-way clutch F2 cooperate to constitute an auxiliary shifting portion or under drive portion U/D. In the main shifting portion MG, the input shaft 22 is connected to the carrier K2 of the second planetary gear set 42, the sun gear S1 of the first planetary gear set 40, and the sun gear S2 of the second planetary gear set 42, through the clutches C0, C1 and C2, respectively. The ring gear R1 of the first planetary gear set 40 is connected to the carrier K2 of the second planetary gear set 42, while the ring gear R2 of the second planetary gear set 42 is connected to the carrier K1 of the first planetary gear set 40. The sun gear S2 of the second planetary gear set 42 is fixed to the stationary member in the form of the housing 28 through the brake B1, while the ring gear R1 of the first planetary gear set 40 is fixed to the housing 28 through the brake B2. The one-way clutch F1 is disposed between the carrier K2 of the second planetary gear set 42 and the housing 28. A first counter gear G1 fixed to the carrier K1 of the first planetary gear set 40 meshes with a second counter gear G2 fixed to the ring gear R3 of the third planetary gear set 46. In the under drive portion U/D, the carrier K3 and sun gear S3 of the third planetary gear set 46 are connected to each other through the clutch C3, and the brake B3 and the one-way clutch F2 are disposed in parallel with each other between the sun gear S3 and the housing 28.

Figure 3:
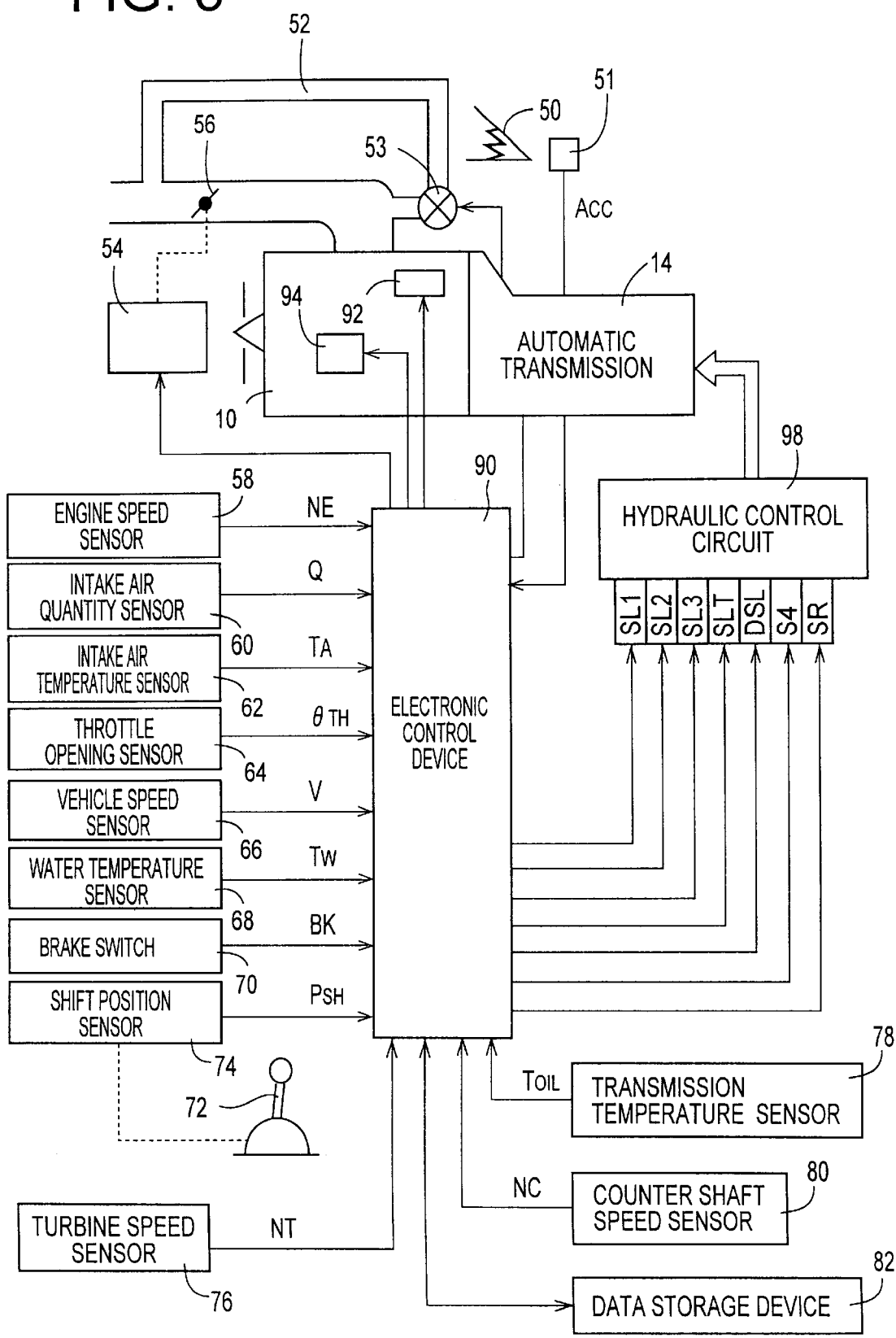
FIG. 3 is a block diagram showing a control system incorporating the control apparatus according to one embodiment of this invention for controlling an engine and the automatic transmission of the vehicle drive system of FIG. 1.
Figure 4:
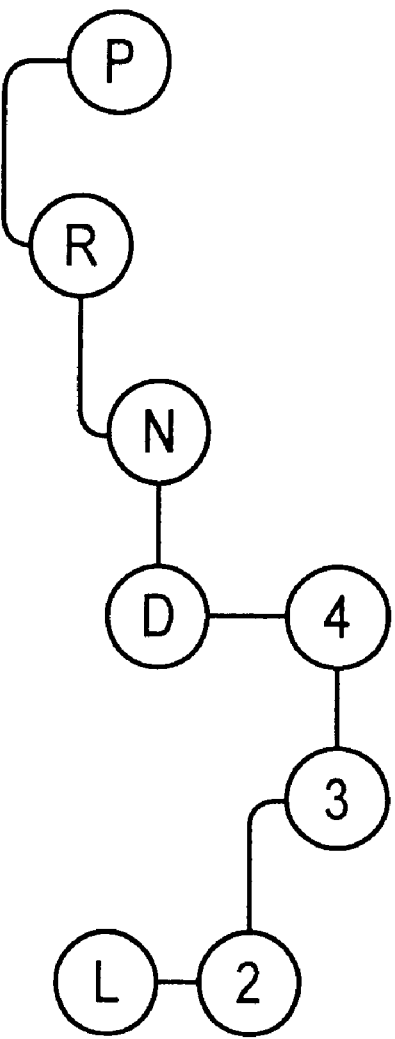
FIG. 4 is a view showing an example of operating positions of a shift lever manually operable to control the automatic transmission.

Each of the clutches C0, C1, C2, C3 and the brakes B1, B2, B3 (hereinafter referred to collectively as "clutches C" and "brakes B" where appropriate) is a hydraulically operated frictional coupling device such as a multiple-disc clutch or band brake, which is operated by a hydraulic actuator. The clutches C and brakes B are selectively engaged and released to selectively establish the five forward drive positions and one rear drive position, as indicated in FIG. 2, by way of example, by switching actions in a hydraulic control circuit 98 (shown in FIG. 3), which take place through selective energization and de-energization of linear solenoids SL1, SL2, SL3 and SLT and solenoids DSL, S4 and SR, and an axial movement of a manual shift valve (not shown), depending upon a presently selected one of a plurality of operating positions of a shift lever 72 (also shown in FIG. 3). The five forward drive positions of the automatic transmission 14 consist of a $1^{st}$-speed position, a $2^{nd}$-speed position, a $3^{rd}$-speed position, a $4^{th}$-speed position and a $5^{th}$-speed position. In FIG. 2, "o" and "x" represent an engaged state and a released state of the clutches C, brakes B and one-way clutches F, respectively, and "Δ" represents an engaged state of the one-way clutches F when a drive force is transmitted to the front drive wheels. The operating positions of the shift lever 72 consist of a parking position P, a rear drive position R, a neutral position N, and five forward drive positions D, 4, 3, 2 and L, as indicated in FIG. 3 wherein a pattern of movement of the shift lever 72 to select the operating positions is shown. The manual shift valve is mechanically connected to the shift lever 72, so that the switching actions take place in the hydraulic control circuit 98, depending upon the presently selected position of the shift lever 72.

For instance, the automatic transmission 14 is shifted up from the $4^{th}$-speed position to the $5^{th}$-speed position by engaging the clutch C3, and shifted down from the $5^{th}$-speed position to the $4^{th}$-speed position by releasing the clutch C3. Further, the automatic transmission 14 is shifted up from the $1^{st}$-speed position to the $2^{nd}$-speed position by engaging the brake B1, and shifted down from the $2^{nd}$-speed position to the first-speed position by releasing the brake B1. However, a shift-up action of the automatic transmission from the $2^{nd}$-speed position to the $3^{rd}$-speed position is achieved by engaging the clutch C0 while concurrently releasing brake B1, and a shift-down action from the $3^{rd}$-speed position to the $2^{nd}$-speed position is achieved by releasing the clutch C0 while concurrently engaging the brake B1. Thus, these shift-up and shift-down actions are achieved by concurrent engaging and releasing actions of respective two frictional coupling devices. Similarly, a shift-up action from the $3^{rd}$-speed position to the $4^{th}$-speed position is achieved by releasing the clutch C1 while concurrently engaging the brake B1, and a shift-down action from the $4^{th}$-speed position to the $3^{rd}$-speed position is achieved by engaging the clutch C1 while concurrently releasing the brake B1. Further, shift-down actions from the $2^{nd}$-speed, $3^{rd}$-speed, $4^{th}$-speed and $5^{th}$-speed positions to a $1^{st}$-speed engine-brake position (indicated in the lowermost row of FIG. 2) are achieved by simultaneous engaging and releasing actions of the appropriate two frictional coupling devices. For instance, the shift-down action from the $3^{rd}$-speed position to the $1^{st}$-speed engine-brake position is achieved by releasing the clutch C0 while concurrently engaging the brake B2. The $1^{st}$-speed engine-brake position is a position in which an engine brake is selected to apply an engine brake to the running vehicle with the automatic transmission 14 placed in the $1^{st}$-speed position.

Referring to the block diagram of FIG. 3, there is shown a control system incorporating a vehicle control apparatus constructed according to one embodiment of this invention for controlling the engine 10, automatic transmission 14, etc. of the vehicle drive system shown in FIG. 1. The control system includes an electronic control device 90 which constitutes a major portion of the vehicle control apparatus of the invention. The electronic control device 90 receives an output signal of an accelerator sensor 51, which represents an operating amount $A_{CC}$ of a manually operable vehicle accelerating member in the form of an accelerator pedal 50. The operating amount $A_{CC}$ represents an output of the engine 10 as required by a vehicle operator, that is, a required amount of output of the engine 10 or a required vehicle drive force to drive the vehicle. An electronic throttle valve 56 is disposed in an intake pipe of the engine 10. The electronic throttle valve 56 is operated by a throttle actuator 54, which is controlled by the electronic control device 90 such that an opening angle $\theta_{TH}$ of the throttle valve 56 corresponds to the operating amount $A_{CC}$ of the accelerator pedal 50. A by-pass passage 52 is connected to the intake pipe, so as to by-pass the electronic throttle valve 56, and is provided with an ISC valve (idling speed control valve) 53, which functions to control an intake air quantity introduced into the engine 10 when the electronic throttle valve 56 is placed in its idling position. Namely, the ISC valve 53 is capable of controlling an idling speed $NE_{IDL}$ of the engine 10. The ISC valve 53 is controlled by the electronic control device 90. The electronic control device 90 receives output signals of various sensors and switches, which include the above-indicated accelerator sensor 51 for detecting the operating amount $A_{CC}$ of the accelerator pedal 50, and further include the following sensors and switch: an engine speed sensor 58 for detecting an operating speed NE of the engine 10; an intake air quantity sensor 60 for detecting an intake air quantity Q introduced into the engine 10; an intake air temperature sensor 62 for detecting a temperature $T_A$ of the intake air; a throttle opening sensor 64 for detecting the opening angle $\theta_{TH}$ of the electronic throttle valve 56; a vehicle speed sensor 66 for detecting a rotating speed $N_{OUT}$ of the counter shaft 44, which is used to calculate a running speed V of the vehicle; a water temperature sensor 68 for detecting a temperature $T_W$ of a cooling water of the engine 10; a brake switch 70 for detecting an operating state BK of a braking system (not shown); a shift position sensor 74 for detecting a presently selected position $P_{SH}$ of the shift lever 72; a turbine speed sensor 76 for detecting a rotating speed NT of the turbine impeller 24, which is equal to a rotating speed $N_{IN}$ of the input shaft 22; a transmission temperature sensor 78 for detecting a temperature $T_{OIL}$ of a working fluid in the hydraulic control circuit 98; and a counter shaft speed sensor 80 for detecting a rotating speed NC of the first counter gear G1. The throttle opening sensor 64 is provided with an idling detector switch for detecting that the throttle valve 56 is placed in its idling position. The electronic control device 90 is connected to a data storage device 82 which includes a learning compensation value data map 112 and a reference compensation value data map 114, which will be described.

Figure 5:
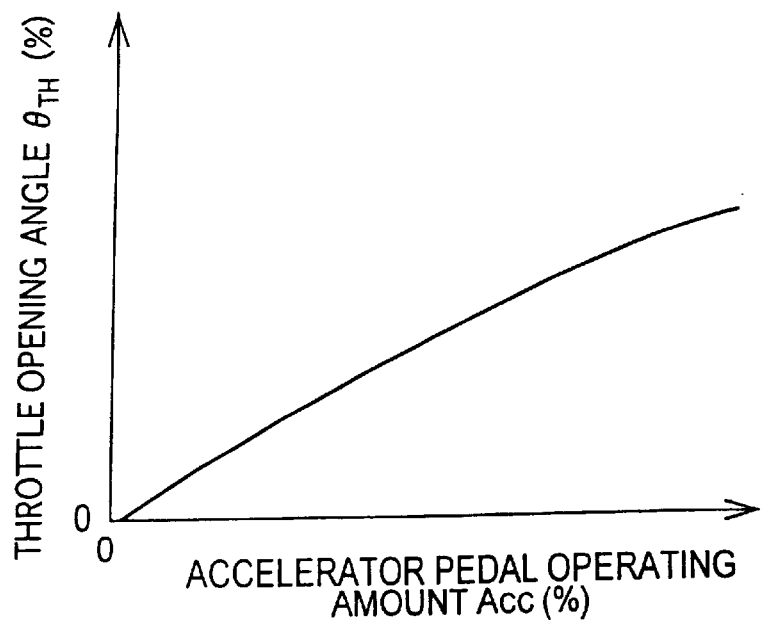
FIG. 5 is a graph indicating an example of a predetermined relationship between an operating amount $A_{cc}$ of an accelerator pedal and an opening angle $\theta_{TH}$ of a throttle valve, which relationship is used by an electronic control device of the control system shown in FIG. 3, to control the throttle valve.

The electronic control device 90 is constituted principally by a microcomputer incorporating a central processing unit (CPU), a random-access memory (RAM), a read-only memory (ROM), and an input-output interface. The CPU operates to process input signals according to programs stored in the ROM, while utilizing a temporary data storage function of the RAM, for controlling the output of the engine 10 and the shifting actions of the automatic transmission 14. The control device 90 may be considered to include an engine controlling section for controlling the engine 10, and a transmission controlling section for controlling the automatic transmission 14. To control the output of the engine 10, the electronic control device 90 controls the throttle actuator 54 to control the opening angle $\theta_{TH}$ of the electronic throttle valve 56, and also controls a fuel injector valve 92 to control the amount of a fuel to be injected into the engine 10, an igniter 94 to control an ignition timing of the engine 10, and the ISC valve 53 to control the idling speed $N_{IDL}$ of the engine 10. For instance, the throttle actuator 54 is controlled to control the electronic throttle valve 56, on the basis of the detected operating amount $A_{CC}$ of the accelerator pedal 50, and according to a predetermined relationship between the operating amount $A_{CC}$ and the opening angle $\theta_{TH}$ of the throttle valve 56, as indicated in FIG. 5 by way of example, such that the opening angle $\theta_{TH}$ is increased with an increase in the operating amount $A_{CC}$ of the accelerator pedal 50.

Figure 6:
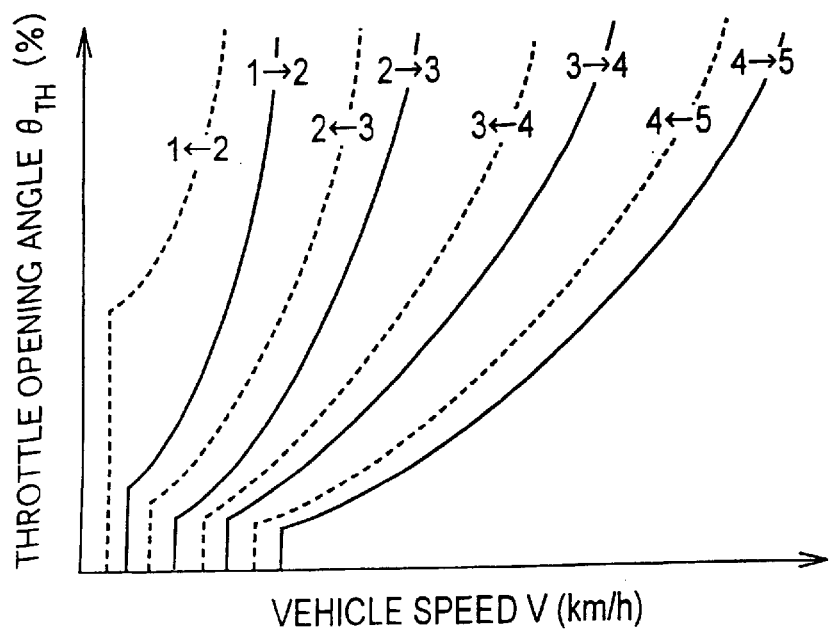
FIG. 6 is a graph showing an example of shift-up and shift-down boundary lines which are represented by stored data maps and used by the electronic control device of FIG. 3, to control shifting actions of the automatic transmission.

The automatic transmission 14 is shifted up and down on the basis of the detected opening angle $\theta_{TH}$ of the throttle valve 56 and the calculated vehicle speed V (obtained from the detected speed NT of the turbine impeller 24), and according to predetermined shift-up and shift-down boundary lines represented by data maps stored in the ROM of the control device 90. In the graph of FIG. 6, the shift-up boundary lines are indicated by solid line, while the shift-down boundary lines are indicated by broken lines. These boundary lines represent relationships between the throttle opening angle $\theta_{TH}$ and vehicle speed V. Described in detail, the forward drive position to which the automatic transmission 14 must be shifted up or down is determined on the basis of the detected opening angle $\theta_{TH}$ and vehicle speed V, and according to the predetermined shift-up and shift-down boundary lines. The automatic transmission 14 is shifted up or down depending upon whether a point defined by the detected opening angle $\theta_{TH}$ and vehicle speed V has moved across any one of the shift-up and shift-down boundary lines in a shift-up or shift-down direction. The above-indicated point represents the specific running condition of the vehicle. The automatic transmission 14 is shifted to the determined operating position, by suitably energizing or de-energizing the solenoids DSL, S4, SR of the hydraulic control circuit 98, and continuously changing the duty ratios of the linear solenoids SL1, SL2, SL3 and SLT. The linear solenoids SL1, SL2 and SL3 permit direct control of the hydraulic pressure values for engaging actions of the brake B1 and the clutches C0 and C1, respectively, so as to prevent a shifting shock and deterioration of friction members of the automatic transmission 14. It will be understood from the shift-up and shift-down boundary lines shown in FIG. 6 that the automatic transmission 14 is shifted up to reduce its speed ratio when the vehicle speed V is increased, or when the opening angle $\theta_{TH}$ of the throttle valve 56 is reduced. In FIG. 6, numerals "1" through "5" represent the $1^{st}$-speed, $2^{nd}$-speed, $3^{rd}$-speed, $4^{th}$-speed and $5^{th}$-speed positions, respectively.

Figure 7:
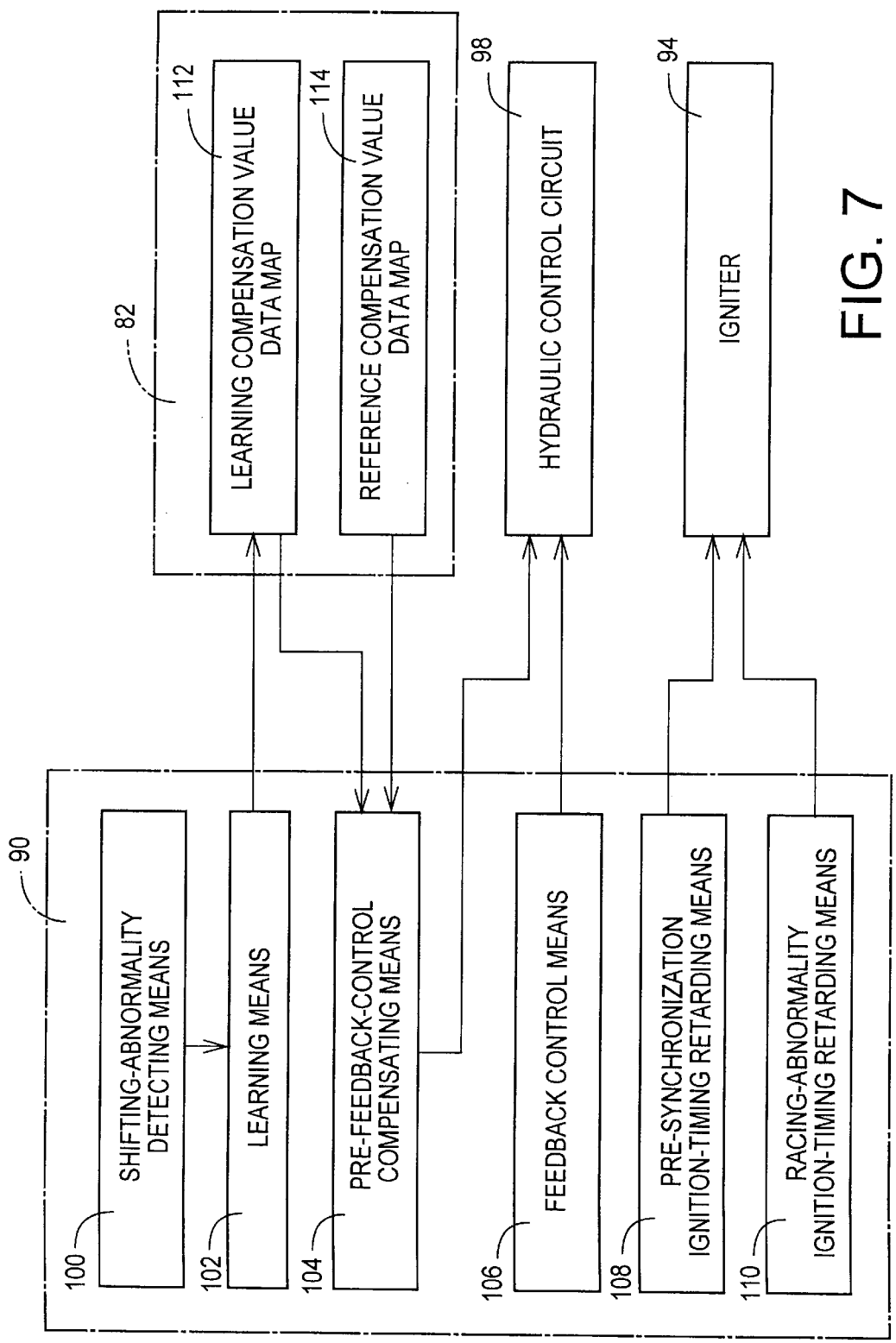
FIG. 7 is a block diagram illustrating various functional means of the electronic control device of FIG. 3 which relate to controlling of the vehicle drive system during a shift-down action of the automatic transmission by concurrent engaging and releasing actions of respective two frictional coupling devices during an operation of an accelerator pedal to drive the vehicle.

The vehicle control apparatus of the electronic control device includes functional means as indicated in FIG. 7, which are operable upon a shift-down action of the automatic transmission 14 which is effected by concurrent engaging and releasing actions of respective two frictional coupling devices (B, C) in response to an increase of a vehicle-operator's required vehicle drive force to drive the vehicle while the vehicle is driven by the engine 10. As shown in FIG. 7, the vehicle control apparatus includes shifting-abnormality detecting means 100, learning means 102, pre-feedback-control compensating means 104, feedback control means 106, pre-synchronization ignition-timing retarding means 108, and racing-abnormality ignition-timing retarding means 110. In the present embodiment, there are three shift-down actions of the automatic transmission 14 to be effected by concurrent engaging and releasing actions of respective two frictional coupling devices, namely: a shift-down action from the $4^{th}$-speed position to the $3^{rd}$-speed position, which is effected by releasing the brake B1 while concurrently engaging the clutch C1; a shift-down action from the $3^{rd}$-speed position to the $2^{nd}$-speed position, which is effected by releasing the clutch C0 while concurrently engaging the brake B1; and a shift-down action from the $4^{th}$-speed position to the $2^{nd}$-speed position, which is effected by releasing the clutch c0 while concurrently engaging the clutch C1. Each of the frictional coupling devices to be released to effect those shift-down actions will be referred to as "first frictional coupling device", while each of the frictional coupling devices to be engaged to effect the shift-down actions will be referred to as "second frictional coupling device".

Figure 12:
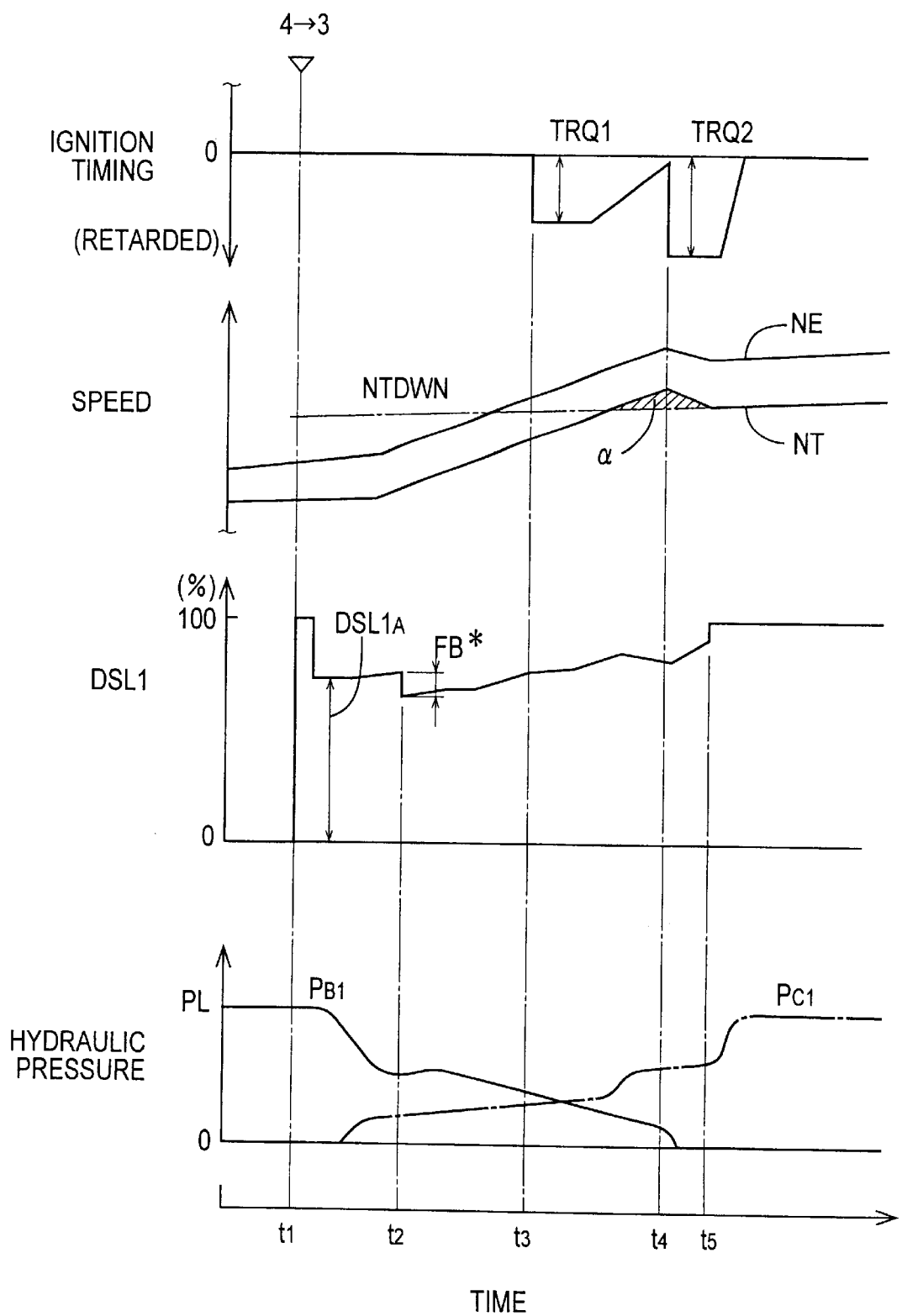
FIG. 12 is a time chart indicating changes of various parameters when the automatic transmission is shifted down from a fourth-speed position to a third-speed position during an operation of the accelerator pedal.

The feedback control means 106 is arranged to control or adjust an engaging force of the first frictional coupling device in the process of its releasing action, by controlling a hydraulic pressure applied to the hydraulic actuator for operating the first frictional coupling device. The feedback control means 106 controls the hydraulic pressure, depending upon a difference of the actual speed NT of the turbine impeller 24 (turbine speed NT) with respect to a target value, such that the turbine speed NT (which is equal to the speed $N_{IN}$ of the input shaft 22 of the automatic transmission 14) is increased at a predetermined rate. The feedback control means 106 controls the hydraulic pressure by controlling the duty ratio of the linear solenoid SL1 or SL2 of the hydraulic control circuit 98, depending upon the specific one of the three shift-down actions described above. Referring to the time chart of FIG. 12, there are indicated changes of various parameters of the vehicle drive system when the automatic transmission 14 is shifted down from the $4^{th}$-speed position to the $3^{rd}$-speed position with a releasing action of the brake B1 and a concurrent engaging action of the clutch C1. In this example of FIG. 12, the feedback control means 106 controls a duty ratio DSL1 of the linear solenoid SL1 of the hydraulic control circuit 98, for regulating a hydraulic pressure $P_{B1}$ of the brake B1 (first frictional coupling device) to be released. In the present embodiment, the hydraulic pressure $P_{B1}$ decreases with an increase of the duty ratio DSL1 of the linear solenoid SL1. In the example of FIG. 12, the automatic transmission 14 is commanded at a point of time t1, to effect the shift-down action from the $4^{th}$-speed position to the $3^{rd}$-speed position, and the duty ratio DSL1 is feedback-controlled by the feedback control means 106 for a time period between points of time t2 and t5.

In FIG. 12, "NTDWN" represents a synchronization speed of the turbine impeller 24, which is the turbine speed NT (input speed of the automatic transmission 14) to be established after completion of the shift-down action. This synchronization speed NTDWN is determined on the basis of the speed ratio of the $3^{rd}$-speed position and the vehicle speed V (or the counter shaft speed NC). The vehicle control apparatus includes control means for feedback-controlling a hydraulic pressure $P_{C1}$ of the clutch C1 (second frictional coupling device), or for controlling the hydraulic pressure $P_{C1}$ by learning compensation. Since the understanding of this control of the hydraulic pressure PC1 is not necessary to understand the present invention, no further description in this respect is deemed necessary. "PL" in FIG. 12 represents a line pressure provided for the hydraulic control circuit 98.

Figure 8:
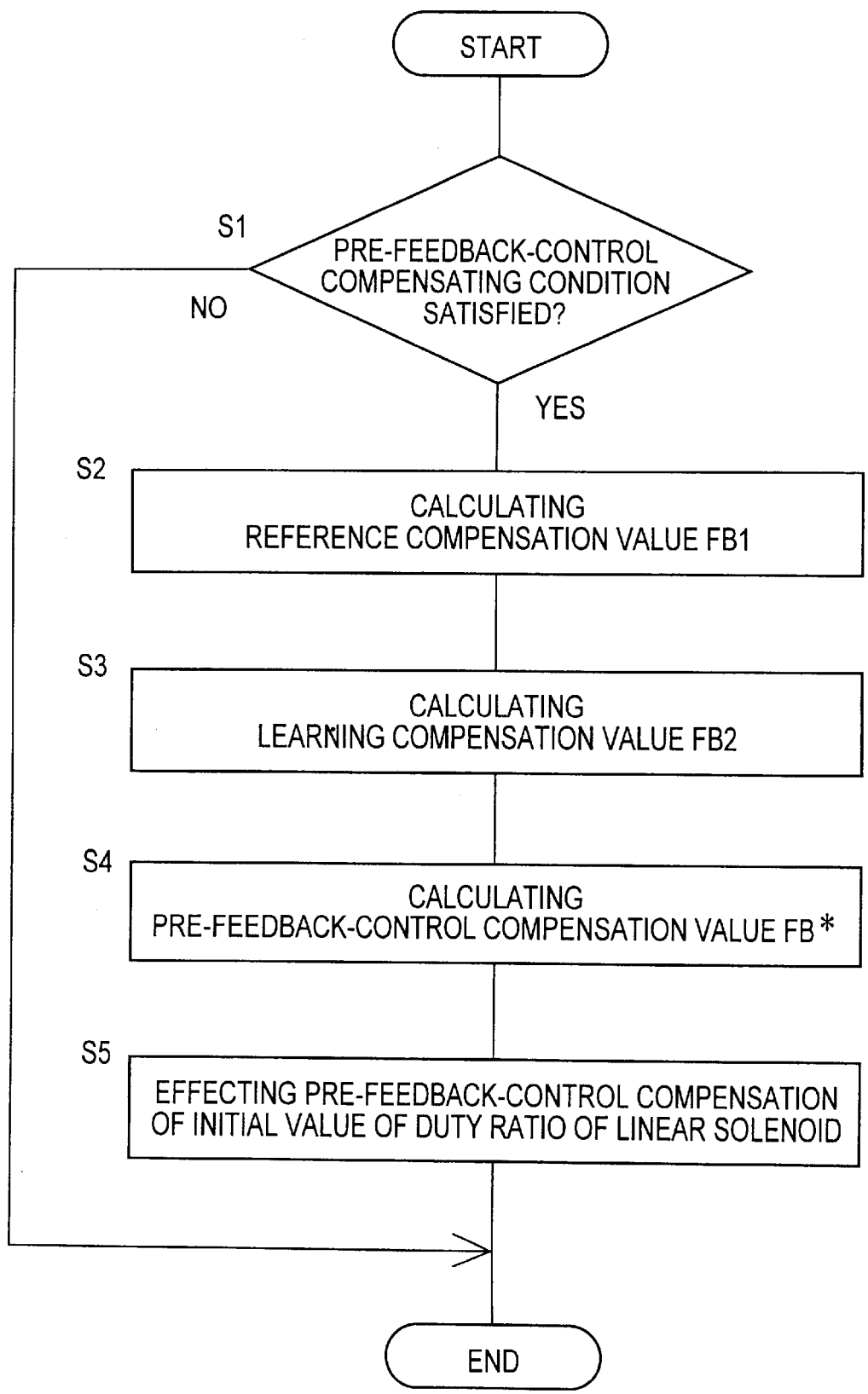
FIG. 8 is a flow chart illustrating a control routine executed by pre-feedback-control compensating means of the electronic control device of FIG. 7.

The pre-feedback-control compensating means 104 of FIG. 7 is arranged to effect learning compensation of an initial value of the hydraulic pressure of the first frictional coupling device at which the feedback control by the feedback control means 106 is initiated, that is, learning compensation of an initial value of the duty ratio of the linear solenoid SL1 or SL2 at which the feedback control is initiated. The pre-feedback-control compensating means 104 is arranged to execute a control routine illustrated in the flow chart of FIG. 8. This control routine is initiated with step S1 to determine whether a predetermined pre-feedback-control compensating condition is satisfied. For example, the determination in step S1 is effected by determining whether the temperature $T_{OIL}$ of the working fluid in the hydraulic control circuit 98 is higher than a predetermined lower limit above which the hydraulic pressure $P_{B1}$, for example, can be accurately controlled. If an affirmative decision (YES) is obtained in step S1, the control flow goes to step S2 to calculate a reference compensation value FB1 of the initial value of the duty ratio. The reference compensation value FB1 is calculated on the basis of the specific shift-down action to be achieved, and selected parameters such as the temperature $T_{OIL}$, vehicle speed V and turbine speed NT, and according to the reference compensation value data map 114 stored in the data storage device 82.

Step S2 is followed by step S3 to calculate a learning compensation value FB2 of the initial value of the duty ratio. Like the reference compensation value FB1, the learning compensation value FB2 is calculated on the basis of selected parameters such as the temperature $T_{OIL}$, vehicle speed V and turbine speed NT, and according to the learning compensation value data map 112 also stored in the data storage device 82. For example, the data storage device 82 is an SRAM which is programmable and non-volatile. The reference compensation value FB1 need not be used. Namely, only the learning compensation value FB2 may be used. The learning compensation value FB2 in this case may be different from that used with the reference compensation value FB1. In the present embodiment, the learning compensation value FB2 is used for only the shift-down action from the $4^{th}$-speed position to the $3^{rd}$-speed position in response to an increase of the required vehicle drive force, and is not used for the shift-down actions from the $3^{rd}$-speed and $4^{th}$-speed positions to the $2^{nd}$-speed position in response to the increase of the required vehicle drive force.

Step S4 is then implemented to calculate a pre-feedback-control compensation value FB*, which is a sum of the reference compensation value FB1 and the learning compensation value FB2. Step S4 is followed by step S5 in which the feedback control means 106 reduces the initial value of the duty ratio of the linear solenoid SL1 or SL2, by the calculated pre-feedback-control compensation value FB*.

Figure 9:
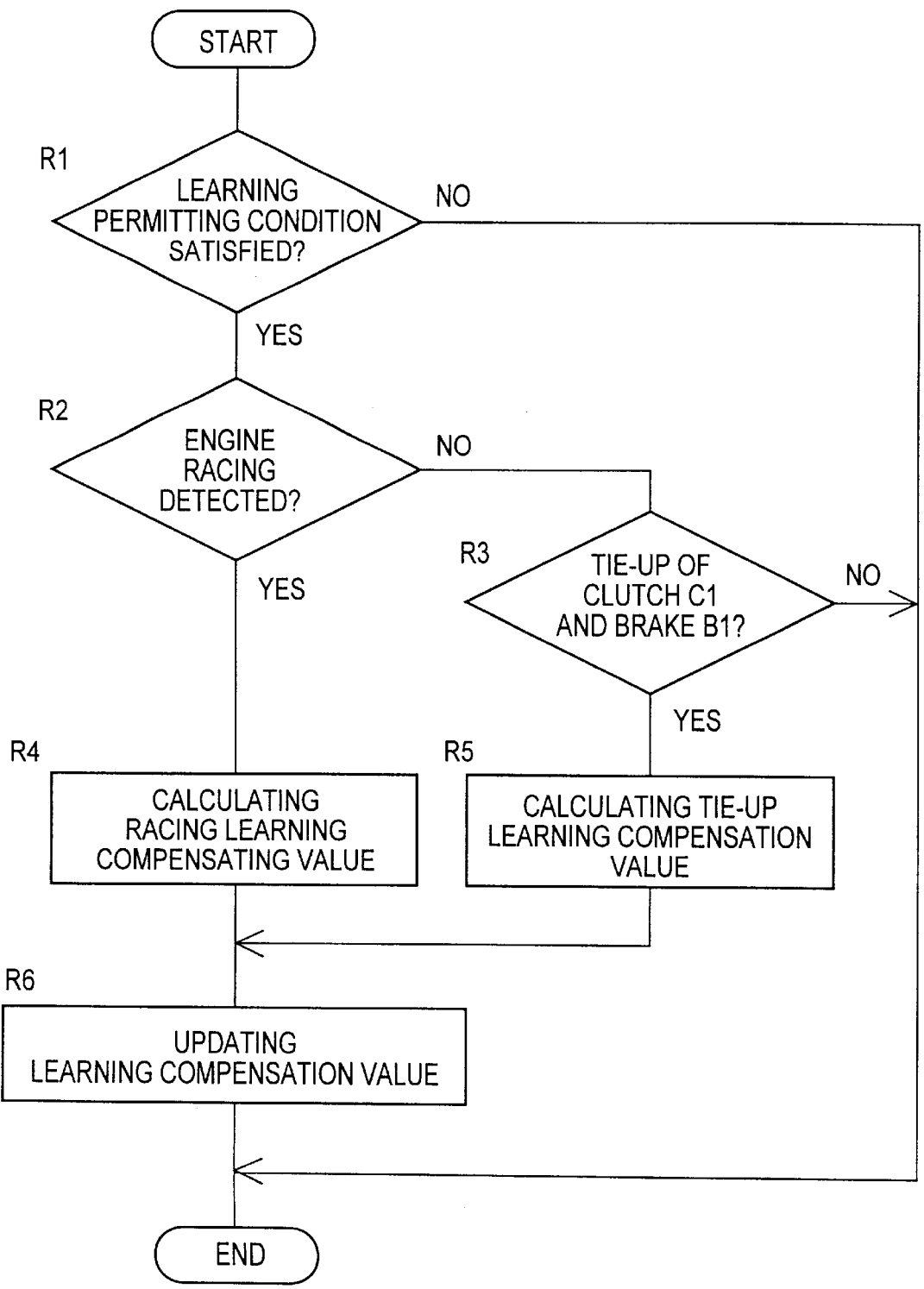
FIG. 9 is a flow chart illustrating a control routine executed by shifting-abnormality detecting means and leaning means of the electronic control device of FIG. 7.

The learning compensation value FB2 is updated by the shifting-abnormality detecting means 100 and the learning means 102 of the electronic control device 90 of FIG. 7, according to a control routine illustrated in the flow chart of FIG. 9. Steps R1 and R4–R6 of this control routine are implemented by the learning means 102. The learning means 102 cooperates with the pre-feedback-control compensating means 104 to constitutes learning compensation means (102, 104).

The control routine of FIG. 9 is initiated after completion of the shift-down action from the $4^{th}$-speed position to the $3^{rd}$-speed position in response to an increase of the required vehicle drive force. Step R1 is implemented to determine whether a predetermined learning permitting condition is satisfied. For example, the learning permitting condition is satisfied when all of the following conditions are satisfied:
(1) The shifting action of the automatic transmission 14 is the shift-down action from the $4^{th}$-speed position to the 3rdd-speed position.
(2) The vehicle speed V is in a predetermined range.
(3) The learning compensation control of the hydraulic pressure of the brake B1 in the fully released state (a duty ratio $DSL1_A$ of the linear solenoid SL1) is stabilized.
(4) The learning compensation control of the hydraulic pressure of the clutch C1 in the fully engaged state is stabilized.
(5) The hydraulic pressure of the clutch C1 has not been subjected to a backup sweep (for compulsory engagement of the clutch C1 to be effected a predetermined time after the controlled engagement).
(6) A time duration from the point of time t1 (FIG. 12) at which the shift-down action is commanded to be effected to the moment of initiation of the inertia phase is in a predetermined range.
(7) The vehicle is running on a road surface whose friction coefficient $\mu$ is higher than a predetermined threshold.

When the predetermined learning permitting condition is satisfied, the control flow goes to step R2 to determine whether the engine 10 has suffered from a racing during the shift-down action of the automatic transmission 14. This determination is effected on the basis of the turbine speed NT in the process of the shift-down action. For instance, the shifting-abnormality detecting means 100 detects the racing, if all of the following conditions are satisfied:
(1) A positive integral of a speed difference (NT–NTDWN), which is represented by an area $\alpha$ indicated in FIG. 12, is larger than a predetermined threshold.
(2) A maximum value of the speed difference (NT–NTDWN) is larger than a predetermined threshold.
(3) A difference $\Delta T1$ of a time length during which the turbine speed NT changes between predetermined two values in the process of the shift-down action, with respect to a predetermined target value is in a predetermined range (between predetermined lower and upper limits).

If the racing of the engine 10 is detected in step R2, the control flow goes to step R4 to calculate a racing learning compensation value, and then to step R6 in which the learning compensation value FB2 in the learning compensation value data map 112, according to the calculated racing learning compensation value. The racing learning compensation value may be a predetermined constant value. In the present embodiment, however, the racing learning compensation value is calculated by multiplying the above-indicated time difference $\Delta T1$ by a predetermined gain. The learning compensation value FB2 is updated by subtracting the thus calculated racing learning compensation value from the original value FB2. To prevent the engine racing, it is necessary to restrict a rise of the turbine speed NT by increasing the hydraulic pressure $P_{B1}$. To this end, the learning compensation value FB2 is increased to reduce the duty ratio DSL1. The racing learning compensation value is limited to predetermined upper and lower limits, and the learning compensation value FB2 is also limited to predetermined upper and lower limits.

If a negative decision (NO) is obtained in step R2, that is, if the engine racing is not detected, the control flow goes to step R3 to determine whether the clutch C1 and the brake B1 have exhibited a tie-up behavior during the shift-down action. This determination is effected on the basis of a change of the turbine speed NT in the process of the shift-down action. For instance, the shifting-abnormality detecting means 100 detects the tie-up behavior if all of the following conditions are satisfied:
(1) The positive integral of the speed difference (NT–NTDWN), which is represented by the area $\alpha$ indicated in FIG. 12, is larger than a predetermined threshold.
(2) The maximum value of the speed difference (NT–NTDWN) is larger than a predetermined threshold.
(3) A difference $\Delta T2$ of a time length during which the turbine speed NT changes between predetermined values in the process of the shift-down action, with respect to a predetermined target value is in a predetermined range (between predetermined lower and upper limits).

If the tie-up behavior is note detected, one cycle of execution of the control routine of FIG. 9 is terminated, without updating the learning compensation value FB2. If the die-up behavior is detected in step R3, the control flow goes to step R5 to calculate a tie-up learning compensation value, and then to step R6 in which the learning compensation value FB2 in the learning compensation value data map 112, according to the calculated tie-up learning compensation value. The tie-up learning compensation value may be a predetermined constant value. In the present embodiment, however, the tie-up learning compensation value is calculated by multiplying the above-indicated time difference $\Delta T12$ by a predetermined gain. The learning compensation value FB2 is updated by subtracting the thus calculated tie-up learning compensation value from the original value FB2. To prevent the tie-up behavior, it is necessary to promote t a rise of the turbine speed NT by lowering the hydraulic pressure $P_{B1}$. To this end, the learning compensation value FB2 is reduced to increase the duty ratio DSL1. The tie-up learning compensation value is also limited to predetermined upper and lower limits.

Figure 10:
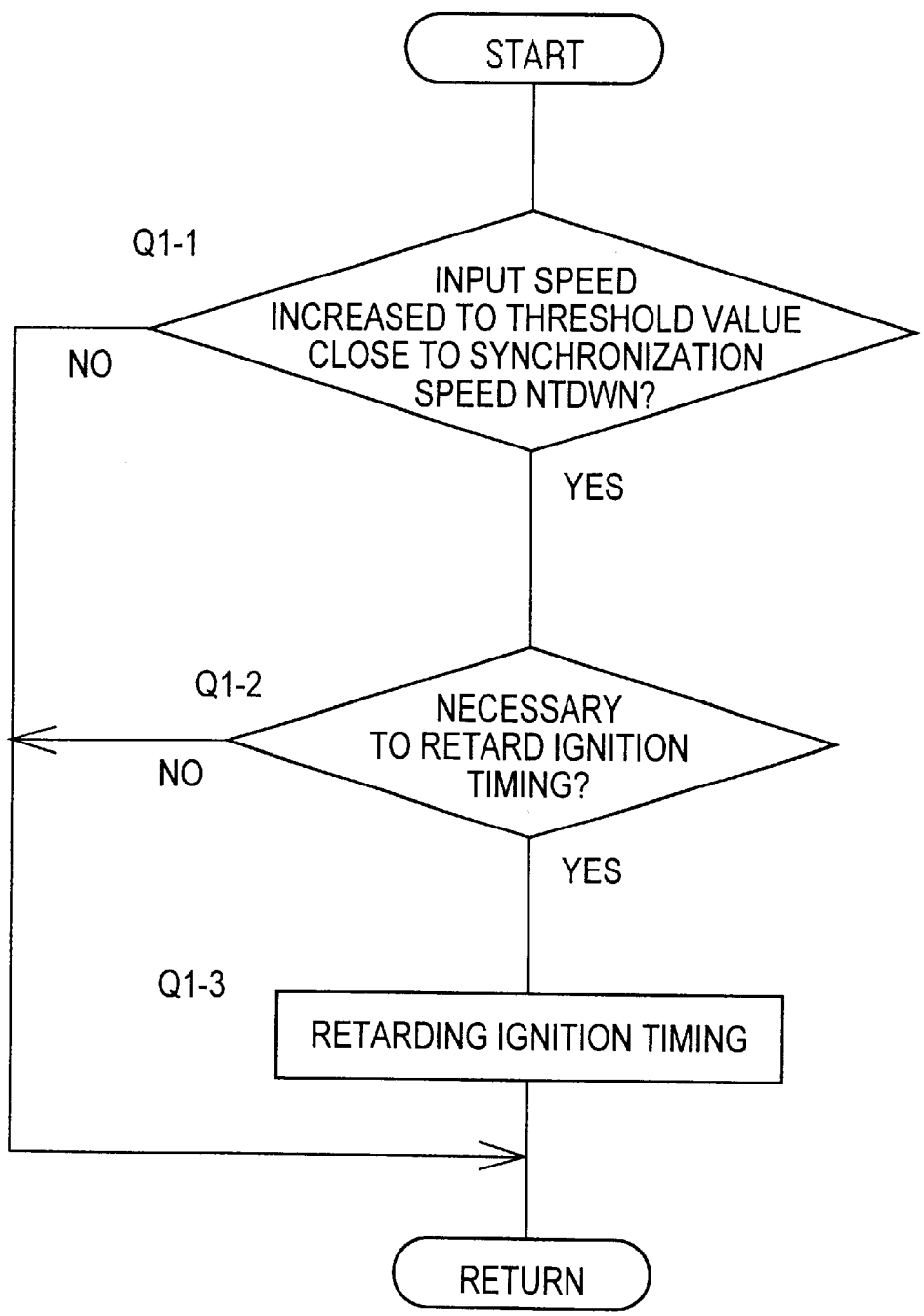
FIG. 10 is a flow chart illustrating a control routine executed by pre-synchronization ignition-timing retarding means of the electronic control device of FIG. 7.
Figure 11:
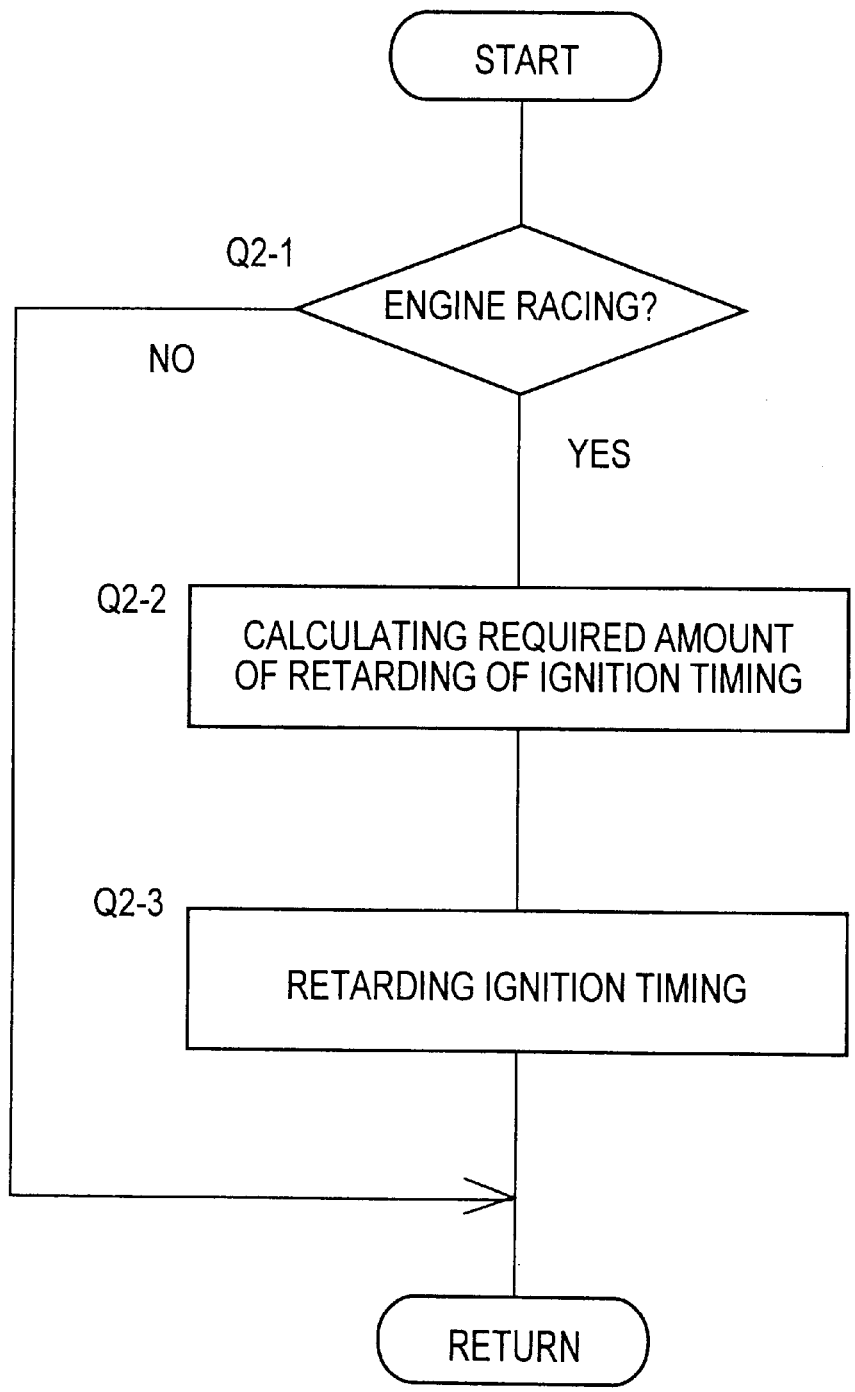
FIG. 11 is a flow chart illustrating a control routine executed by racing-abnormality ignition-timing retarding means of the electronic control device of FIG. 7.

Referring back to the block diagram of FIG. 7, the pre-synchronization ignition-timing retarding means 108 is arranged to execute a control routine illustrated in the flow chart of FIG. 10, while the racing-abnormality ignition-timing retarding means 110 is arranged to execute a control routine illustrated in the flow chart of FIG. 11. These control routines are executed in the process of each of the three shift-down actions during an operation of the accelerator pedal 50, that is, for all of the shift-down action from the $4^{th}$-speed position to the $3^{rd}$-speed position, the shift-down action from the $3^{rd}$-speed position to the $2^{nd}$-speed position, and the shift-down action from the $4^{th}$-speed position to the $2^{nd}$-speed position. Step Q1-1 of the control routine of FIG.

10 corresponds to substantial synchronization determining means, while steps Q1-2 and Q1-3 of the same control routine correspond to pre-synchronization output reducing means. Step Q2-1 of the control routine of FIG. 11 corresponds to racing-abnormality detecting means, while steps Q2-2 and Q2-3 correspond to racing-abnormality output reducing means.

The control routine of FIG. 10 is initiated with step Q1-1 corresponding to the substantial synchronization determining means, to determine whether the input speed of the automatic transmission 14 has been increased to a threshold value close to the synchronization speed NTDWN. This determination is effected by determining whether a speed difference (NTDWN−NT) has become smaller than a predetermined threshold value. This threshold value may be a predetermined constant value, or may be determined on the basis of the specific kind of the shift-down action, and selected parameters such as the temperature $T_{OIL}$, vehicle speed V and estimated input torque of the automatic transmission 14, and according to a predetermined data map or equation. If an affirmative decision (YES) is obtained in step Q1-1, the control flow goes to step Q1-2 to determine whether the ignition timing should be retarded or not. This determination is based on a calculated required amount TRQ1 of retarding of the ignition timing. If the calculated amount TRQ1 is zero, one cycle of execution of the routine is terminated. If the calculated amount TRQ1 is not zero, the control flow goes to step Q1-3 in which the igniter 94 is controlled to retard the ignition timing by the calculated required amount TRQ1, for thereby reducing the output of the engine 10. The required amount TRQ1 of retarding of the ignition timing is determined on the basis of selected parameters such as the vehicle speed V and estimated input torque of the automatic transmission 14. The required amount TRQ1 is zeroed when the vehicle speed V or the estimated input torque is lower or smaller than a predetermined threshold. In the example of FIG. 12, the ignition timing is retarded by the required amount TRQ1 at a point of time t3, when the affirmative decision (YES) is obtained in both of steps Q1-1 and Q1-2. As shown in FIG. 12, the ignition timing is held retarded for a predetermined time, and the amount of retarding is gradually reduced to zero.

The control routine of FIG. 11 is initiated with step Q2-1 corresponding to the racing-abnormality detecting means, to determine whether the engine 10 is suffering from a racing. This determination is effected by determining whether the speed difference (NT−NTDWN) has become larger than a predetermined threshold value. This threshold value may be a predetermined constant value, or may be determined on the basis of the specific kind of the shift-down action, and selected parameters such as the temperature $T_{OIL}$, vehicle speed V and estimated input torque of the automatic transmission 14, and according to a predetermined data map or equation. If an affirmative decision (YES) is obtained in step Q2-1, the control flow goes to step Q2-2 to calculate a required amount TRQ2 of retarding of the ignition timing, and to step q2-3 in which the igniter 94 is controlled to retard the ignition timing by the calculated required amount TRQ2, for thereby reducing the output of the engine 10. The required amount TRQ2 of retarding is determined on the basis of selected parameters such as the vehicle speed V. In the example of FIG. 12, the ignition timing is retarded by the required amount TRQ2, at a point of time t4, when the affirmative decision (YES) is obtained in step Q2-1. In this case, too, the ignition timing is held retarded for a predetermined time, and the amount of retarding is gradually reduced to zero.

As described above, the present embodiment is arranged to feedback-control the duty ratio DSL1 of the linear solenoid SL1 for controlling the hydraulic pressure $P_{B1}$ of the brake B1 to be released to effect the shift-down action from the $4^{th}$-speed position to the $3^{rd}$-speed position during an operation of the accelerator pedal 50, and is further arranged to update the learning compensation value FB2 determining the pre-feedback-control compensation value FB*, upon detection of a racing of the engine 10 or a tie-up behavior of the clutch C1 and brake B1, so that the hydraulic pressure $P_{B1}$ of the brake B1 can be suitably controlled, irrespective of a low feedback control response of the hydraulic pressure, and the shift-down action can be achieved in a comparatively short time while preventing the engine racing and the tie-up behavior of the frictional coupling devices.

The illustrated embodiment is further arranged to feedback-control the duty ratio DSL1 or DSL2 of the linear solenoid SL1 or SL2 for controlling the hydraulic pressure $P_{B1}$, $P_{C0}$ of the brake B1 or clutch C0 to be released to effect the shift-down action from the $4^{th}$-speed position to the $3^{rd}$-speed position, or from the $3^{rd}$-speed or $4^{th}$-speed position to the $2^{nd}$-speed position. The illustrated embodiment is further arranged such that the ignition timing is retarded by the pre-synchronization ignition-timing retarding means 108, to reduce the output of the engine 10, when the turbine speed NT has been increased to the threshold value close to the synchronization speed NTDWN. Accordingly, the shift-down actions can be achieved in a relatively short time, while preventing the engine racing, irrespective of a low feedback control response of the hydraulic pressure.

The illustrated embodiment is further arranged such that the ignition timing is retarded by the racing-abnormality ignition-timing retarding means 110, to reduce the output of the engine 10 upon detection of the engine racing, as well as to feedback-control the duty ratio DSL1 or DSL2 of the linear solenoid SL1 or SL2 for controlling the hydraulic pressure $P_{B1}$, $P_{C0}$ of the brake B1 or clutch C0, as described above. Accordingly, the shift-down actions can be achieved in a relatively short time, while preventing the engine racing, irrespective of a low feedback control response of the hydraulic pressure.

While the preferred embodiment of this invention has been described in detail by reference to the accompanying drawings, for illustrative purpose only, it is to be understood that the present invention may be embodied with various changes, modifications and improvements which may occur to those skilled in the art, in the light of the foregoing teachings.

What is claimed is:

1. An apparatus for controlling a drive system of an automotive vehicle including a manually operable vehicle accelerating member, a drive power source, and an automatic transmission having a plurality of forward drive positions which have respective different speed ratios and which are selectively established by respective combinations of engaging and releasing actions of a plurality of frictional coupling devices, said apparatus comprising feedback control means operable upon a shift-down action of said automatic transmission which is effected by concurrent releasing and engaging actions of respective first and second frictional coupling devices of said plurality of frictional coupling devices, during an operation of said manually operable vehicle accelerating member to drive the automotive vehicle with said drive power source, said feedback control means feedback-controlling an engaging force of said first frictional coupling device, said apparatus further comprising:

shifting-abnormality detecting means for detecting one of a racing of said drive power source and a tie-up behavior of said first and second frictional coupling devices during said shift-down action of said automatic transmission; and learning compensation means operable upon detection of said one of said racing and said tie-up behavior by said shifting-abnormality detecting means, for effecting learning compensation of an initial value of the engaging force of said first frictional coupling device at which a feedback control of said engaging force by said feedback control means is initiated.

2. An apparatus according to claim 1, wherein said shifting-abnormality detecting means detects said one of said racing of said drive power source and said tie-up behavior of said first and second frictional coupling devices, on the basis of a change of an input speed of said automatic transmission in the process of said shift-down action.

3. An apparatus according to claim 1, wherein said learning compensation means changes said initial value of said engaging force by an amount which is determined on the basis of a difference of a time length during which an input speed of said automatic transmission changes between two predetermined values in the process of said shift-down action, with respect to a predetermined target value.

4. An apparatus for controlling a drive system of an automotive vehicle including a manually operable vehicle accelerating member, a drive power source, and an automatic transmission having a plurality of forward drive positions which have respective different speed ratios and which are selectively established by respective combinations of engaging and releasing actions of a plurality of frictional coupling devices, said apparatus comprising feedback control means operable upon a shift-down action of said automatic transmission which is effected by concurrent releasing and engaging actions of respective first and second frictional coupling devices of said plurality of frictional coupling devices, during an operation of said manually operable vehicle accelerating member to drive the automotive vehicle with said drive power source, said feedback control means feedback-controlling an engaging force of said first frictional coupling device, said apparatus further comprising:

substantial synchronization determining means operable upon said shift-down action of said automatic transmission, for determining whether an input speed of said automatic transmission has been increased to a threshold value close to a synchronization speed to be established after completion of said shift-down action; and pre-synchronization output reducing means operable upon determination by said substantial synchronization determining means that said input speed has been increased to said threshold value, for reducing an output of said drive power source.

5. An apparatus according to claim 4, wherein said substantial synchronization determining means determines whether said input speed of said automatic transmission has been increased to said threshold value, depending upon whether a difference of said input speed from said synchronization speed has become smaller than a predetermined amount.

6. An apparatus according to claim 4, wherein said pre-synchronization output reducing means reduces said output of said drive power source, by retarding an ignition timing of said drive power source.

7. An apparatus according to claim 6, wherein said pre-synchronization output reducing means retards said ignition timing on the basis of a running speed of the vehicle and an estimated input torque of said automatic transmission.

8. An apparatus according to claim 4, further comprising:

racing-abnormality detecting means for detecting a racing of said drive power source during said shift-down action of said automatic transmission; and racing-abnormality output reducing means operable upon detection of said racing by said racing-abnormality detecting means, for immediately reducing an output of said drive power source.

9. An apparatus according to claim 4, characterized by further comprising:

shifting-abnormality detecting means for detecting one of a racing of said drive power source and a tie-up behavior of said first and second frictional coupling devices during said shift-down action of said automatic transmission; and learning compensation means operable upon detection of said one of said racing and said tie-up behavior by said shifting-abnormality detecting means, for effecting learning compensation of an initial value of the engaging force of said first frictional coupling device at which a feedback control of said engaging force by said feedback control means is initiated.

10. An apparatus for controlling a drive system of an automotive vehicle including a manually operable vehicle accelerating member, a drive power source, and an automatic transmission having a plurality of forward drive positions which have respective different speed ratios and which are selectively established by respective combinations of engaging and releasing actions of a plurality of frictional coupling devices, said apparatus comprising feedback control means operable upon a shift-down action of said automatic transmission which is effected by concurrent releasing and engaging actions of respective first and second frictional coupling devices of said plurality of frictional coupling devices, during an operation of said manually operable vehicle accelerating member to drive the automotive vehicle with said drive power source, said feedback control means feedback-controlling an engaging force of said first frictional coupling device, said apparatus further comprising:

racing-abnormality detecting means for detecting a racing of said drive power source during said shift-down action of said automatic transmission; and racing-abnormality output reducing means operable upon detection of said racing by said racing-abnormality detecting means, for immediately reducing an output of said drive power source.

11. An apparatus according to claim 10, wherein said racing-abnormality detecting means detects said racing of said drive power source, depending upon whether an input speed of said automatic transmission has become higher by more than a predetermined amount than a synchronization speed to be established after completion of said shift-down action.

12. An apparatus according to claim 10, wherein said racing-abnormality output reducing means reduces said output of said drive power source, by retarding an ignition timing of said drive power source.

13. An apparatus according to claim 12, wherein said racing-abnormality output reducing means retards said ignition timing on the basis of a running speed of the vehicle and an estimated input torque of said automatic transmission.

14. An apparatus according to claim 10, further comprising:

tie-up detecting means for detecting a tie-up behavior of said first and second frictional coupling devices during said shift-down action of said automatic transmission; and learning compensation means operable upon detection of said racing by said racing-abnormality detecting means, or upon detection of said tie-up behavior by said tie-up detecting means, for effecting learning compensation of an initial value of the engaging force of said first frictional coupling device at which a feedback control of said engaging force by said feedback control means is initiated.

* * * * *